US 8,108,471 B2

(12) United States Patent
Fujita-Yuhas

(10) Patent No.: US 8,108,471 B2
(45) Date of Patent: Jan. 31, 2012

(54) COMMUNICATING A RESPONSE TO THE CREATOR OF A VOICE MESSAGE FORWARDED BY ANOTHER

(75) Inventor: Tim J. Fujita-Yuhas, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 758 days.

(21) Appl. No.: 11/402,505

(22) Filed: Apr. 11, 2006

(65) Prior Publication Data

US 2007/0239835 A1   Oct. 11, 2007

(51) Int. Cl.
*G06F 15/16* (2006.01)
*H04M 11/00* (2006.01)
*H04M 1/64* (2006.01)

(52) U.S. Cl. .............. 709/206; 709/204; 379/88.16; 379/88.18; 379/88.22

(58) Field of Classification Search .............. 379/100, 379/142; 709/204, 206
See application file for complete search history.

(56) References Cited

U.S. PATENT DOCUMENTS

| | | | | |
|---|---|---|---|---|
| 6,212,408 B1 * | 4/2001 | Son et al. | | 455/563 |
| 6,226,359 B1 * | 5/2001 | Montgomery et al. | | 379/67.1 |
| 7,079,632 B2 * | 7/2006 | Fellenstein et al. | | 379/88.22 |
| 7,167,451 B1 * | 1/2007 | Oran | | 370/252 |
| 7,293,064 B1 * | 11/2007 | Lundy et al. | | 709/206 |
| 7,336,668 B2 * | 2/2008 | Adams | | 370/396 |
| 7,548,954 B2 * | 6/2009 | Brown et al. | | 709/206 |
| 2002/0115429 A1 * | 8/2002 | Deluca et al. | | 455/413 |
| 2002/0124057 A1 * | 9/2002 | Besprosvan | | 709/219 |
| 2003/0220784 A1 | 11/2003 | Fellenstein et al. | | |
| 2005/0041786 A1 * | 2/2005 | Craig | | 379/88.17 |
| 2005/0188030 A1 * | 8/2005 | Hudecek | | 709/206 |

OTHER PUBLICATIONS http://www.utexas.edu/its/smartvoice/index.html, Information Techology Services "SmartVoice Voice Mail—Your Way. Your Choice," 2 pages, last modified Mar. 17, 2006.
http://www.utexas.edu/its/smartvoice/customizing.html, Information Techology Services "SmartVoice Voice Mail—Customizing SmartVoice", 5 pages, last modified Mar. 17, 2006.
http://www.utexas.edu/its/smartvoice/phone.html, Information Techology Services "SmartVoice Voice Mail—Telephone Access to SmartVoice," 6 pages, last modified Feb. 6, 2006.
http://support.avaya.com/japple/css/japple?PAGE=Prodcut&temp.productID=107796, Avaya, Octel® 250 and 350 Overview, pages, 2006.
EPO Communication, Reference No. P32487EP-PCT; Application No. 07797214.9-1237-2008195 PCT/US2007/066232, 6 pages, Nov. 10, 2009.

* cited by examiner

*Primary Examiner* — Jeffrey Pwu
*Assistant Examiner* — Guang Li
(74) *Attorney, Agent, or Firm* — Baker Botts L.L.P.

(57) ABSTRACT

In one embodiment, a method for responding to a voice message includes accessing input from a first user at an endpoint indicating a desire to communicate to a second user a response to a voice message created by the second user and forwarded to the first user by a third user. The forward includes the voice message and at least one introduction to the voice message. The method also includes accessing the response, which includes a voice message created by the first user, automatically determining an address associated with the second user for communicating the response to the second user, and automatically communicating the response to the determined address without communicating to the determined address the introduction to the voice message forwarded to the first user.

17 Claims, 2 Drawing Sheets

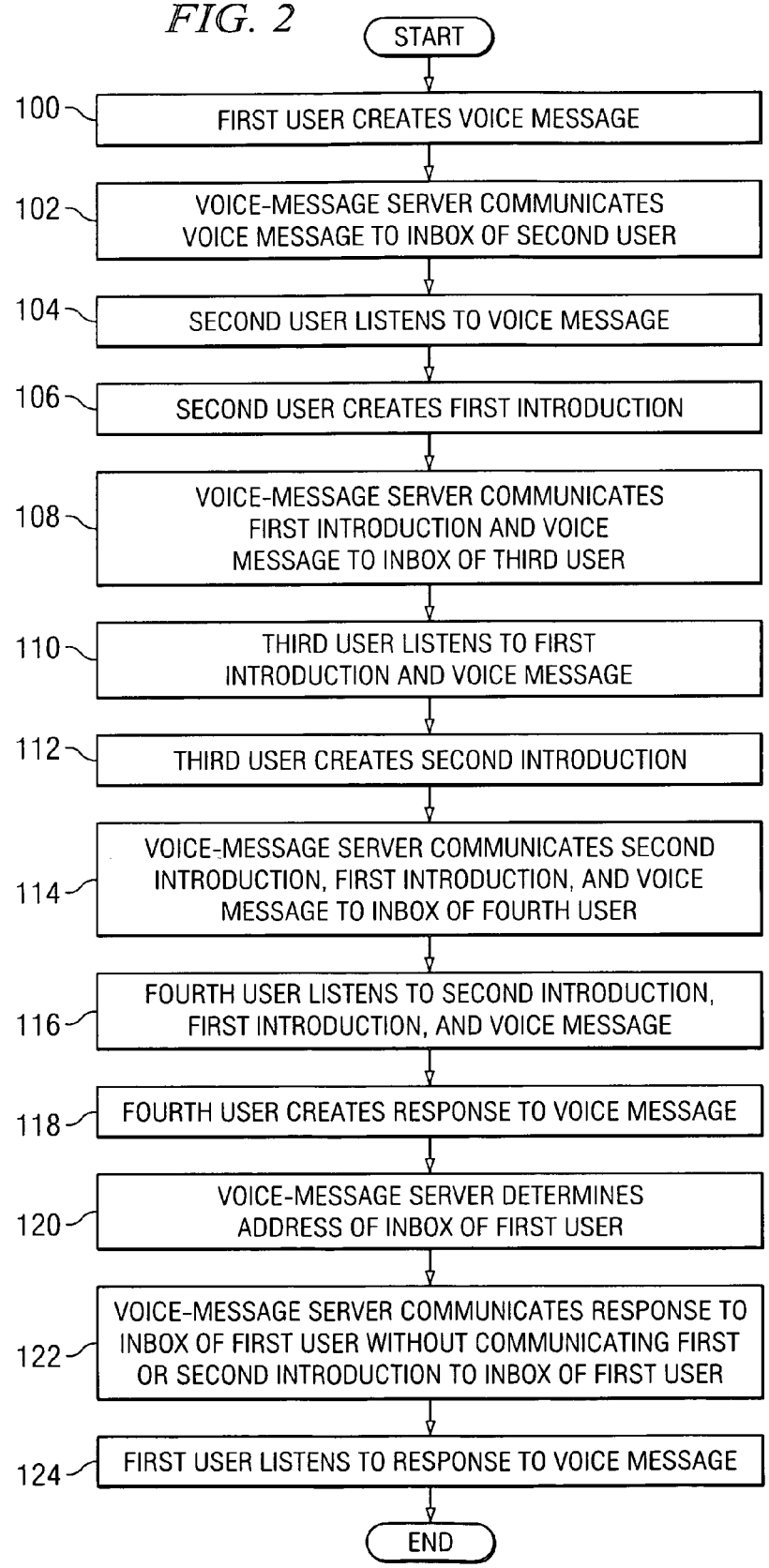

US 8,108,471 B2

COMMUNICATING A RESPONSE TO THE CREATOR OF A VOICE MESSAGE FORWARDED BY ANOTHER

TECHNICAL FIELD OF THE INVENTION

This invention relates in general to voice messaging and more particularly to communicating a response to the creator of a voice message forwarded by another.

BACKGROUND OF THE INVENTION

Personnel in an organization often use voice messages to delegate work. A voice message facilitating the delegation of work often travels from one person to another until the voice message reaches a charge who should respond directly to the person who created the voice message. Each person who forwards the voice message usually tacks an introduction onto the voice message, and the voice message usually reaches the charge in a forward that includes the voice message and all the introductions tacked onto the voice message en route to its destination.

SUMMARY OF THE INVENTION

Particular embodiments of the present invention may reduce or eliminate problems and disadvantages previously associated with voice messaging.

In one embodiment, a method for responding to a voice message includes accessing input from a first user at an endpoint indicating a desire to communicate to a second user a response to a voice message created by the second user and forwarded to the first user by a third user. The forward includes the voice message and at least one introduction to the voice message. The method also includes accessing the response, which includes a voice message created by the first user, automatically determining an address associated with the second user for communicating the response to the second user, and automatically communicating the response to the determined address without communicating to the determined address the introduction to the voice message forwarded to the first user.

Particular embodiments of the present invention may provide one or more technical advantages. As an example, particular embodiments may facilitate responding directly to the creator of a voice message forwarded by another. As another example, particular embodiments may obviate a user having to look up and then enter an address (such as, for example, a telephone number extension) of a creator of a voice message to respond directly to the creator of the voice message. As another example, particular embodiments may facilitate withholding from the creator of a voice message information in one or more introductions tacked onto the voice message in one or more forwards of the voice message, some of which may not be intended for the creator of the voice message. Particular embodiments may provide all, some, or none of these technical advantages. Particular embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and features and advantages thereof, reference is made to the following description, taken in conjunction with the accompanying drawings, in which:

FIG. 2 illustrates an exemplary method for communicating a response to the creator of a voice message forwarded by another.

DESCRIPTION OF EXEMPLARY EMBODIMENTS

Figure 1:
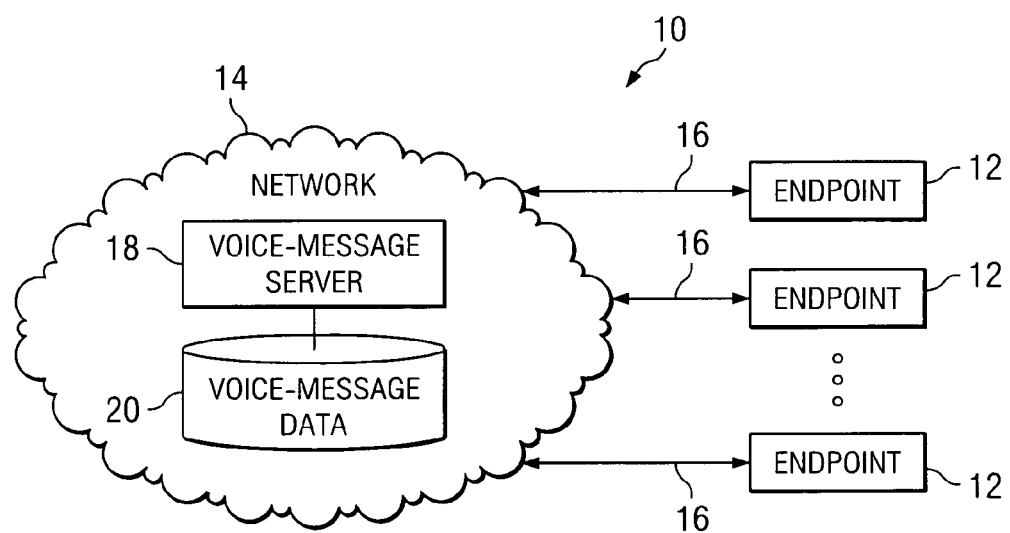
FIG. 1 illustrates an exemplary system for communicating a response to the creator of a voice message forwarded by another.

FIG. 1 illustrates an exemplary system 10 for communicating a response to the creator of a voice message forwarded by another. System 10 includes endpoints 12 that communicate with each other via network 14. In particular embodiments, network 14 is a local area network (LAN), a wireless LAN (WLAN), a wide area network (WAN), a metropolitan area network (MAN), a portion of the Internet, or another network 14 or a combination of two or more such networks 14. In particular embodiments, network 14 is an analog network. In particular embodiments, network 14 connects to one or more other networks, such as, for example, the Internet, the Public Switched Telephone Network (PSTN), or both. The present invention contemplates any suitable network 14 for making voice or telephone-device calls. One or more links 16 couple an endpoint 12 to network 14. In particular embodiments, one or more links 16 each include one or more wireline, wireless, or optical links 16. In particular embodiments, one or more links 16 each include a LAN, a WLAN, a WAN, a MAN, a portion of the Internet, or another link 16 or a combination of two or more such links 16. In particular embodiments, one or more links 16 are each analog links 16. The present invention contemplates any suitable links 16 coupling endpoints 12 to network 14.

Endpoints 12 enable users at endpoints 12 to communicate with each other. As an example and not by way of limitation, an endpoint 12 may include a legacy telephone, a telephone having voice over Internet Protocol (VoIP) capabilities, a mobile telephone (which may, but need not, have VoIP capabilities), a personal digital assistant (PDA), a computer system, or another endpoint 12 or a combination of two or more such endpoints 12. A legacy telephone may be a landline telephone set that may generate dual-tone multifrequency (DTMF) signals in response to a user pressing keys on the telephone set. A telephone having VoIP capabilities may be a wireless or wireline Internet Protocol (IP) telephone that may generate data providing DTMF signals in response to a user pressing keys on the telephone or otherwise providing input to the telephone. A mobile telephone may be a wireless telephone capable of connecting to an 802.11 or other WLAN, a cellular telephone network, or both. A computer system may be a notebook computer system capable of connecting to an LAN, a WLAN, or both. To communicate with one or more other users, a user at a computer system coupled to network 14 may access a telephone application on the computer system, a voice-message client at the computer system, a web browser on the computer system capable of accessing a web page or website providing voice-message functionality, or an application on the computer system supporting e-mail (such as, for example, MICROSOFT OUTLOOK or a similar application) including a voice-message form. The present invention contemplates any suitable endpoints 12.

Network 14 includes a voice-message server 18. In particular embodiments, voice-message server 18 includes one or more voice-message servers 18. In particular embodiments, voice-message server 18 is a hardware, software, or embedded logic component or a combination of two or more such components residing at one or more servers in network 14. In particular embodiments, voice-message server 18 includes or has access to one or more databases, file systems, or storage devices capable of storing voice-message data 20. Voice-message data 20 may include one or more inboxes that may each include one or more voice messages left for a user. A user may have access to one or more inboxes.

Voice-message server 18 provides voice-message functionality to one or more endpoints 12. As an example and not by way of limitation, a user at a wireline IP telephone coupled to network 18 my lift a handset on the telephone and provide input instructing the telephone to connect to voice-message server 18. The telephone may connect to voice-message server 18, and voice-message server 18 may prompt the user to enter a passcode to access an inbox of the user at voice-message server 18. The inbox may include one or more voice messages left for the user. The user may enter the passcode at the telephone, and the telephone may communicate the passcode to voice-message server 18. Voice-message server 18 may attempt to verify the passcode to authenticate the user and, if the passcode entered by the user is correct, provide the user access to the inbox. The user may then provide input at the telephone instructing voice-message server 18 to play one or more voice messages from the inbox, and voice-message server 18 may play the voice messages to the user. After each voice message, the user may provide input at the telephone specifying handling instructions to voice-message server 18 corresponding to the voice message. The handling instructions may direct voice-message server 18 to replay the voice message, delete the voice message, save the voice message, forward the voice message to one or more other users, or communicate a response (or reply) to the voice message, as described below. The present invention contemplates any suitable voice-message system.

Personnel in an organization often use voice messages to delegate work. A voice message facilitating the delegation of work often travels from one person to another until the voice message reaches a charge who should respond directly to the person who created the voice message. Each person who forwards the voice message usually tacks an introduction onto the voice message, and the voice message usually reaches the charge in a forward that includes the voice message and all or some of the introductions tacked onto the voice message en route to its destination.

As an example and not by way of limitation, a first user may create a voice message at a first endpoint 12 coupled to network 14 and leave the voice message at voice-message server 18 for a second user. The second user may subsequently listen to the voice message at a second endpoint 12 coupled to network 14 and then provide input instructing voice-message server 18 to forward the voice message to a third user. To forward the voice message to the third user, voice-message server 18 may request or even require the second user to create a first introduction (which may also be a voice message) to the voice message for the third user. The second user may create the first introduction, and voice-message server 18 may tack the first introduction onto the voice message created by the first user and communicate the voice message and the first introduction to the third user. In the forward to the third user, the first introduction may precede the voice message.

The third user may subsequently listen to the forward at a third endpoint 12 coupled to network 14 and then provide input instructing voice-message server 18 to forward the voice message to a fourth user. To forward the voice message to the fourth user, voice-message server 18 may request or even require the third user to create a second introduction (which may also be a voice message) to the voice message for the fourth user. The third user may create the second introduction, and voice-message server 18 may tack the second introduction onto the voice message created by the first user and communicate the voice message and the first and second introductions to the fourth user. In the forward to the fourth user, the second introduction may precede the first introduction and the voice message. The above process may continue until the voice message reaches an nth user who should respond directly to the first user.

In particular embodiments, to respond directly to the first user, the $n^{th}$ user provides input instructing voice-message server 18 to respond directly to the first user. As an example and not by way of limitation, the $n^{th}$ user may press a series of keys (such as, for example, *12 or 345) on a wireline IP telephone to instruct voice-message server 18 to respond directly to the first user. In response to the input from the $n^{th}$ user, voice-message server 18 may automatically prompt the $n^{th}$ user to create a response. Voice-message server 18 may then record the response. Voice-message server 18 may automatically determine an address of an inbox of the first user (such as, for example, a voice-message extension of the first user) and communicate the response to the inbox of the first user. As a result, the $n^{th}$ user need not look up and then enter an address of the first user to respond directly to the first user.

Voice-message server 18 may communicate the response to the inbox of the first user without communicating the first, second, or any other introductions tacked onto the voice message en route the $n^{th}$ user. As a result, to respond directly to the first user, the $n^{th}$ user need not divulge or otherwise disclose to the first user the first, second, or any other introductions, which may include information not intended for communication to the first user. In particular embodiments, voice-message server 18 automatically removes the first, second, and all other introductions tacked onto the voice message en route the $n^{th}$ user. The voice-message server 18 may, but need not, tack the response onto the voice message created by the first user and communicate both the response and the voice message to the inbox of the first user. In the reply to the first user, the response may precede the voice message. In particular embodiments, voice-message server 18 enables the $n^{th}$ user to choose between having only the response communicated to the inbox of the first user and having both the response and the voice message communicated to the inbox of the first user. In particular embodiments, voice-message server 18 communicates only the response to the inbox of the first user and does not communicate the voice message created by the first user to the inbox of the first user. In particular embodiments, voice-message server 18 automatically prohibits communication of the voice message created by the first user to the inbox of the first user.

FIG. 2 illustrates an exemplary method for communicating a response to the creator of a voice message forwarded by another. The method begins at step 100, where a first user creates a voice message. At step 102, per instructions from the first user, voice-message server 18 communicates the voice message to an inbox of a second user. At step 104, the second user accesses and listens to the voice message. At step 106, the second user creates a first introduction to the voice message. At step 108, per instructions from the second user, voice-message server 18 communicates the first introduction and the voice message in a forward to an inbox of a third user. At step 110, the third user accesses and listens to the first introduction and the voice message. At step 112, the third user creates a second introduction to the voice message. At step 114, per instructions from the third user, voice-message server 18 communicates the second introduction, the first introduction and the voice message in a forward to an inbox of a fourth user.

At step 116, the fourth user accesses and listens to the second introduction, the first introduction, and the voice message. At step 118, the fourth user creates a response to the voice message. Per instructions from the fourth user, voice-message server 18 determines an address of an inbox of the first user at step 120 and communicates the response to an inbox of the first user without communicating the first or second introductions to the inbox of first user. As discussed above, in particular embodiments, voice-message server 18 communicates both the response created by the fourth user and the voice message created by the first user to the inbox of the first user. At step 124, the first user accesses and listens to the response to the voice message, at which point the method ends. Although particular steps in the method illustrated in FIG. 2 have been illustrated and described as occurring in a particular order, the present invention contemplates any suitable steps of the method illustrated in FIG. 2 occurring in any suitable order. Although the method illustrated in FIG. 2 involves four users and two introductions, the present invention contemplates any suitable number of users and suitable number of introductions.

Particular embodiments have been used to describe the present invention, and a person having skill in the art may comprehend one or more changes, substitutions, variations, alterations, or modifications within the scope of the appended claims. The present invention encompasses all such changes, substitutions, variations, alterations, and modifications.

What is claimed is:

1. An apparatus comprising:
one or more processors; and
a memory coupled to the processors comprising instructions executable by the processors, the processors operable when executing the instructions to:
receive input from a first user at an endpoint indicating a desire to communicate to a second user a response to a first voice message created by the second user and forwarded to the first user by a third user, the forward comprising the first voice message and at least one introductory voice message to the first voice message wherein the introductory voice message is intended for the first user and is not intended for the second user; and
in response to the input:
access a second voice message created by the first user;
construct the response, the response comprising the first and second voice messages and excluding the at least one introductory voice message to the first voice message;
determine a telephone address associated with the second user for communicating the response to the second user; and
communicate the response to the determined telephone address.

2. The apparatus of claim 1, wherein the telephone address is a voice-message extension of the second user.

3. The apparatus of claim 1, wherein a server comprises the processors and the memory.

4. The apparatus of claim 1, wherein the introduction to the voice message precedes the voice message in the forward to the first user from the third user.

5. The apparatus of claim 1, wherein the third user created the introduction to the voice message.

6. The apparatus of claim 1, wherein the input from the first user comprises one or more particular dual-tone multifrequency (DTMF) entries.

7. The apparatus of claim 1, wherein the endpoint comprises a telephone comprising voice over Internet Protocol (VoIP) capabilities.

8. The apparatus of claim 1, wherein the endpoint comprises an application on a computer system supporting e-mail, the application comprising a voice message form.

9. A method comprising:
receiving by one or more computer systems input from a first user at an endpoint indicating a desire to communicate to a second user a response to a first voice message created by the second user and forwarded to the first user by a third user, the forward comprising the first voice message and at least one introductory voice message introduction to the first voice message wherein the introductory, voice message is intended for the first user and is not intended for the second user; and
in response to the input:
accessing by the one or more computer systems a second voice message created by the first user;
constructing by the one or more computer systems the response, the response comprising the first and second voice messages and excluding the at least one introductory voice message introduction to the first voice message;
determining by the one or more computer systems a telephone address associated with the second user for communicating the response to the second user; and
communicating by the one or more computer systems the response to the determined telephone address.

10. The method of claim 9, wherein the telephone address is a voice-message extension of the second user.

11. The method of claim 9, executed by a server.

12. The method of claim 9, wherein the introduction to the voice message precedes the voice message in the forward to the first user from the third user.

13. The method of claim 9, wherein the third user created the introduction to the voice message.

14. The method of claim 9, wherein the input from the first user comprises one or more particular dual-tone multifrequency (DTMF) entries.

15. The method of claim 9, wherein the endpoint comprises a telephone comprising voice over Internet Protocol (VoIP) capabilities.

16. The method of claim 9, wherein the endpoint comprises an application on a computer system supporting e-mail, the application comprising a voice-message form.

17. One or more non-transitory computer-readable storage media embodying software operable when executed to:
receive input from a first user at an endpoint indicating a desire to communicate to a second user a response to a first voice message created by the second user and forwarded to the first user by a third user, the forward comprising the first voice message and at least one introductory voice message introduction to the first voice message wherein the introductory voice message is intended for the first user and is not intended for the second user; and
in response to the input:
access a second voice message created by the first user;
construct the response, the response comprising the first and second voice messages and excluding the at least one introductory voice message introduction to the first voice message;
determine a telephone address associated with the second user for communicating the response to the second user; and
communicate the response to the determined telephone address.

* * * * *